United States Patent
Marshall

(10) Patent No.: US 12,313,083 B2
(45) Date of Patent: May 27, 2025

(54) ADDITIVELY MANUFACTURED OPTIMIZED FUEL PUMP VOLUTE ENTRANCE

(71) Applicant: Hamilton Sundstrand Corporation, Charlotte, NC (US)

(72) Inventor: Travis Marshall, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/193,359

(22) Filed: Mar. 30, 2023

(65) Prior Publication Data
US 2024/0328433 A1 Oct. 3, 2024

(51) Int. Cl.
| | |
|---|---|
| F04D 29/44 | (2006.01) |
| B33Y 80/00 | (2015.01) |
| F04D 7/02 | (2006.01) |
| F04D 29/42 | (2006.01) |

(52) U.S. Cl.
CPC ............. F04D 29/445 (2013.01); F04D 7/02 (2013.01); F04D 29/4293 (2013.01); B33Y 80/00 (2014.12)

(58) Field of Classification Search
CPC ........ F04D 29/40; F04D 29/42; F04D 29/426; F04D 29/4293; F04D 29/445; F04D 7/02; B33Y 80/00
See application file for complete search history.

(56) References Cited

U.S. PATENT DOCUMENTS

| | | | |
|---|---|---|---|
| 3,860,360 A * | 1/1975 | Yu ............... | F04D 29/441 415/208.3 |
| 5,090,868 A | 2/1992 | Mosure et al. | |
| 2015/0267714 A1 * | 9/2015 | Irwin ............ | F04D 29/4273 415/204 |
| 2020/0347728 A1 * | 11/2020 | Binek ........... | F23R 3/283 |
| 2022/0412344 A1 | 12/2022 | Marshall | |
| 2022/0412345 A1 | 12/2022 | Marshall et al. | |
| 2022/0412370 A1 | 12/2022 | Marshall et al. | |
| 2022/0412371 A1 | 12/2022 | Marshall | |

FOREIGN PATENT DOCUMENTS

| | | | | |
|---|---|---|---|---|
| FR | 3032243 A1 * | 8/2016 | ............ | F02K 9/46 |
| RU | 2103560 C1 | 1/1998 | | |

OTHER PUBLICATIONS

FR3032243A1_MachineTranslation (Danguy, F) Aug. 5, 2016. [retrieved on Jan. 25, 2024] Retrieved from: Espacenet (Year: 2016).*

(Continued)

Primary Examiner — Elton K Wong
(74) Attorney, Agent, or Firm — Kinney & Lange, P.A.

(57) ABSTRACT

A pump assembly includes an impeller, a diffuser ring, and an additively manufactured coupler. The diffuser ring is fluidly coupled to the impeller. The additively manufactured coupler is fluidly coupled to the diffuser ring. The additively manufactured coupler has a teardrop shaped cross-section. The pump assembly also includes a volute fluidly coupled to the coupler. The volute is configured to receive fluid from the diffuser ring through the additively manufactured coupler. The teardrop geometry of the additively manufactured coupler is designed to reduce pressure loss in fluid flowing to the volute.

18 Claims, 5 Drawing Sheets

(56) References Cited

OTHER PUBLICATIONS

Diegel, O. 'Design for AM'. In: Godec,D.,Gonzalez-Gutierrez,J., Nordin,A.,Pei, E.,Ureña Alcázar,J. (eds) 'A Guide to Additive Manufacturing' (2022). Springer Tracts in Additive Manufacturing. Springer, Cham [retrieved on Jun. 14, 2024]. URL:<https://doi.org/10.1007/978-3-031-05863-9_4> (Year: 2022).*

FR3032243A1_PartialTranslation (Danguy, F.) Aug. 5, 2016. [received on Feb. 20, 2025] Received from: STIC (Year: 2016).*

Extended European Search Report for European Patent Application No. 24165777.4, Dated Aug. 13, 2024, 7 Pages.

* cited by examiner

ADDITIVELY MANUFACTURED OPTIMIZED FUEL PUMP VOLUTE ENTRANCE

BACKGROUND

Fuel pumps can be configured to distribute fluid flow from an impeller to downstream valves. In order to do so, fuel pumps can use parts, such as the impeller, to impart pressure on the fluid as it travels through the fuel pump. The pressure on the fluid aids in fluid flow through the downstream valves. Therefore, it is desirable to minimize fluid pressure loss as the fluid flows through the fuel pump.

SUMMARY

A pump assembly includes an impeller and a diffuser ring fluidly coupled to the impeller. The pump assembly further includes a volute fluidly coupled to the diffuser ring via an additively manufactured coupler having a teardrop shaped cross section. The volute is configured to receive fluid from the diffuser ring through the additively manufactured coupler.

A method for forming a fluid connection between a volute and an input interface configured to provide fluid to the volute includes additively manufacturing a coupler having a teardrop shaped cross-section. The method further includes connecting the coupler between an input interface and a volute.

DETAILED DESCRIPTION

According to the techniques of this disclosure, an additively manufactured coupler in a pump assembly can be designed and manufactured to minimize pressure losses for a fluid traveling through an impeller and to a volute through the additively manufactured coupler. The retained pressure of the fluid is beneficial for the downstream valves through which the fluid travels after exiting the volute. The additively manufactured coupler can have a teardrop shaped cross-section, which can be an improvement over prior art configurations in which the volute entrance geometry is limited by casting or machining methods. Additive manufacturing methods can ensure an efficient build for the coupler with a reduced defect and scrap rate.

Figure 1:
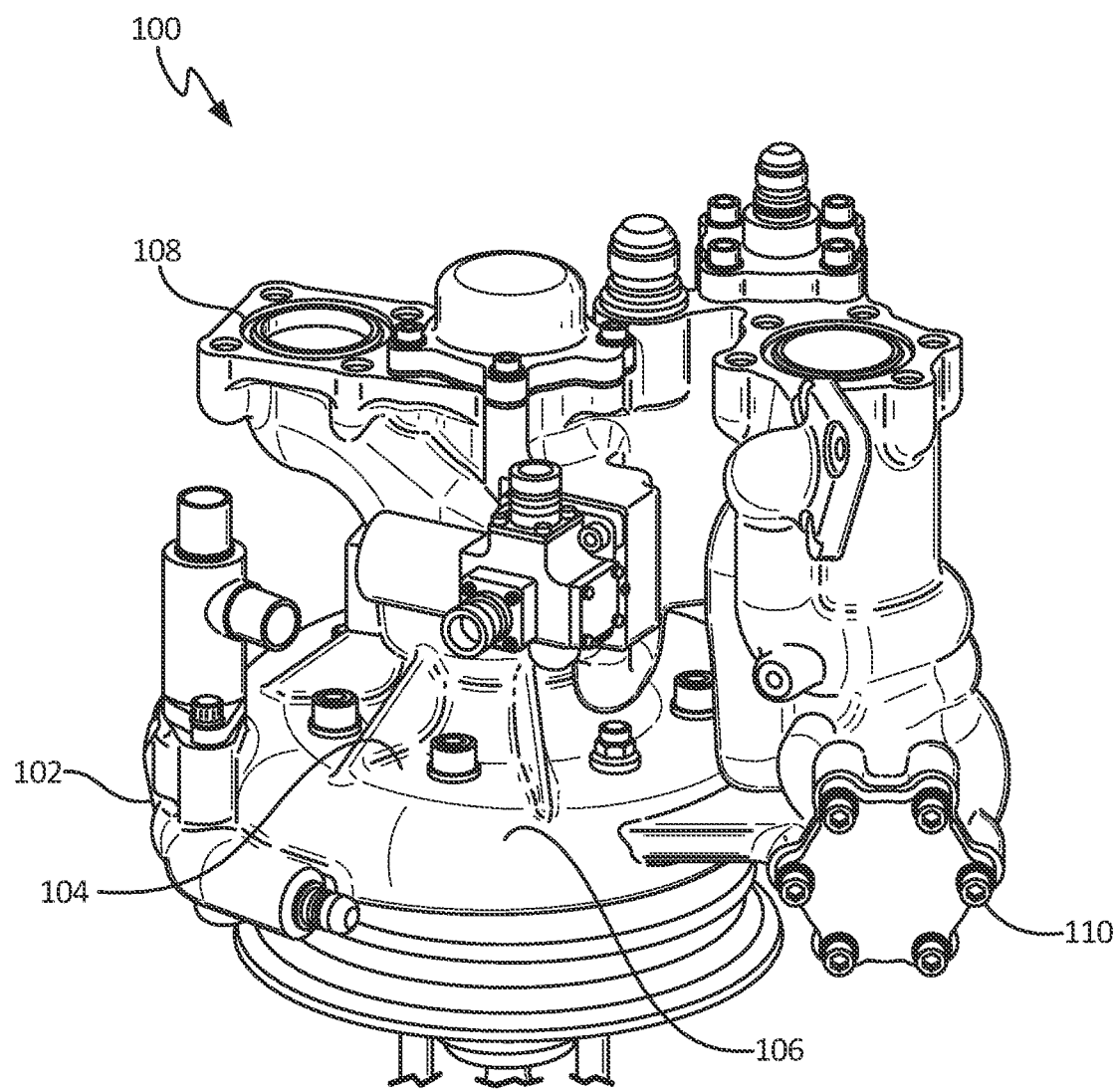
FIG. 1 is a perspective view of a fuel pump.

FIG. 1 is a perspective view of fluid pump assembly 100. Fluid pump assembly 100 can be encased by an additively manufactured fuel pump case 102. Additively manufactured fuel pump case 102 can include impeller housing section 104 and volute housing section 106. Fluid pump assembly 100 can further include main flow inlet 108 and exit valve section 110.

In operation fluid pump assembly 100 can operate as a fuel pump where fuel is received at main flow inlet 108 and flows through a valve therein. Fuel can then flow through an impeller contained within impeller housing section 104 to increase pressure relative to the pressure of the fuel flowing through main flow inlet 108. Fuel can then flow through a diffuser ring (not pictured) to further increase the pressure of the fuel. Fuel can then flow through a volute contained within volute housing section 106 and exit fluid pump assembly 100 through a valve contained within exit valve section 110.

Figure 2:
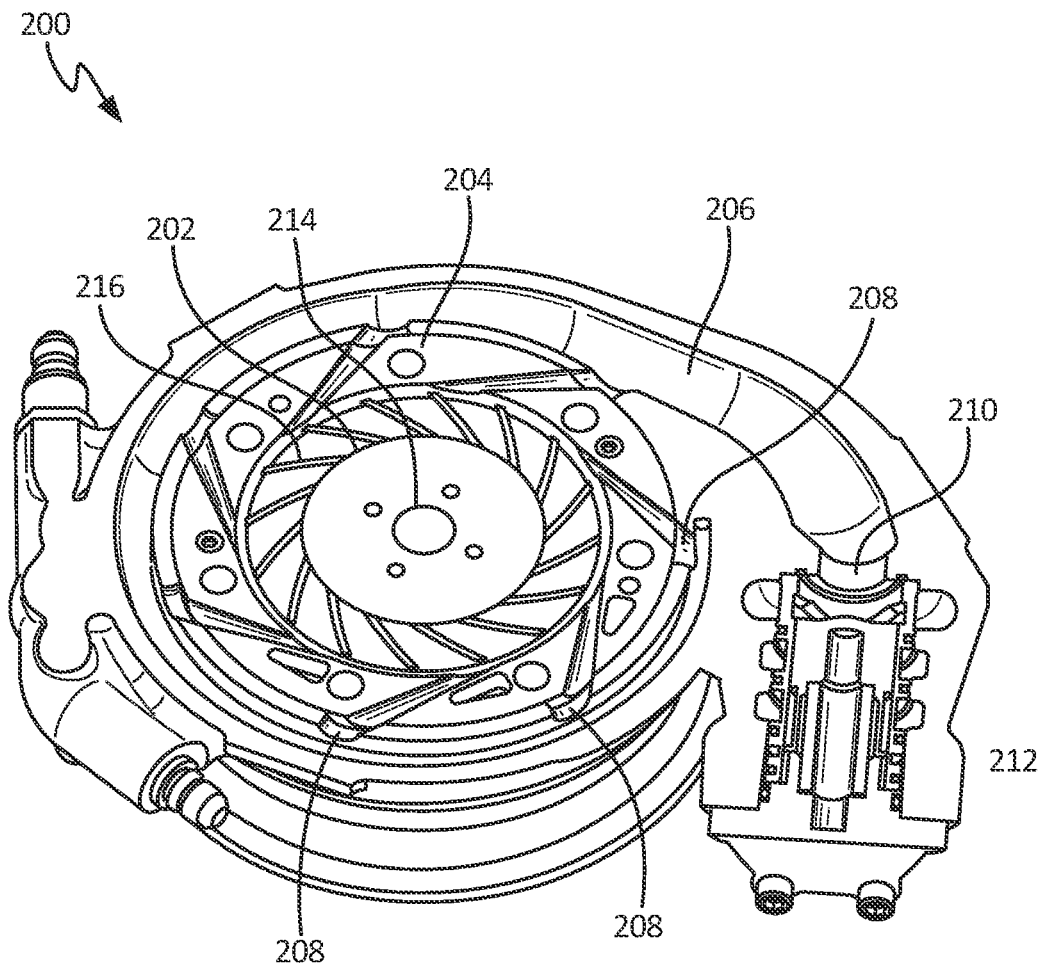
FIG. 2 is a perspective view of an impeller, diffuser, and volute assembly.

FIG. 2 is a perspective view of volute assembly 200. Volute assembly 200 can be a part of pump assembly 100 of FIG. 1. Volute assembly 200 includes impeller 202, diffuser ring 204, volute 206, and exit valve 212. Impeller 202 can be contained within impeller housing section 104 of fluid pump assembly 100. Volute 206 can be contained within volute housing section 106 of fluid pump assembly 100. Exit valve 212 can be contained within exit valve section 110 of fluid pump assembly 100. Volute 206 includes coupler 208 and volute exit 210. Impeller 202 includes hub 214 and perimeter 216. Impeller 202 is fluidly connected to diffuser ring 204. Diffuser ring 204 is fluidly connected to volute 206 via coupler 208. Volute 206 is fluidly connected to exit valve 212 via volute exit 210.

In operation, fluid flows from an upstream valve, such as a valve contained within main flow inlet 108 of FIG. 1, to impeller 202. Impeller 202 can include hub 214 and blades extending from hub 214. Fluid from the upstream valve enters impeller 202 at a leading edge of a blade extending from hub 214. The blades of impeller 202 can then rotate, thereby imparting additional pressure upon the fluid as the fluid travels to perimeter 216 of impeller 202. Impeller 202 can include any number of impeller blades which can be used to apply additional pressure to the fluid.

From perimeter 216 of impeller 202, the fluid then flows to diffuser ring 204. From diffuser ring 204, the fluid flows through coupler 208, and to volute 206. As depicted, diffuser ring 204 can connect to volute 206 at a plurality of entry points via a plurality of couplers 208. Fluid can then flow through volute 206 to exit valve 212 through volute exit 210.

As fluid flows through volute assembly 200, it is desirable to maintain fluid pressure for ideal volute performance. The purpose of volute 206 within volute assembly 200 is to maximize efficiency in maintaining energy imparted from impeller 202 in the form of energy from fluid pressure. Thus, it is specifically desirable to minimize pressure losses when the fluid flows from diffuser ring 204, through coupler 208, and to volute 206. The geometry of coupler 208 can be designed to improve the retention of fluid pressure as fluid enters volute 206. The improved geometry of coupler 208 will be described in additional detail with respect to FIGS. 4A and 4B.

Figure 3A:
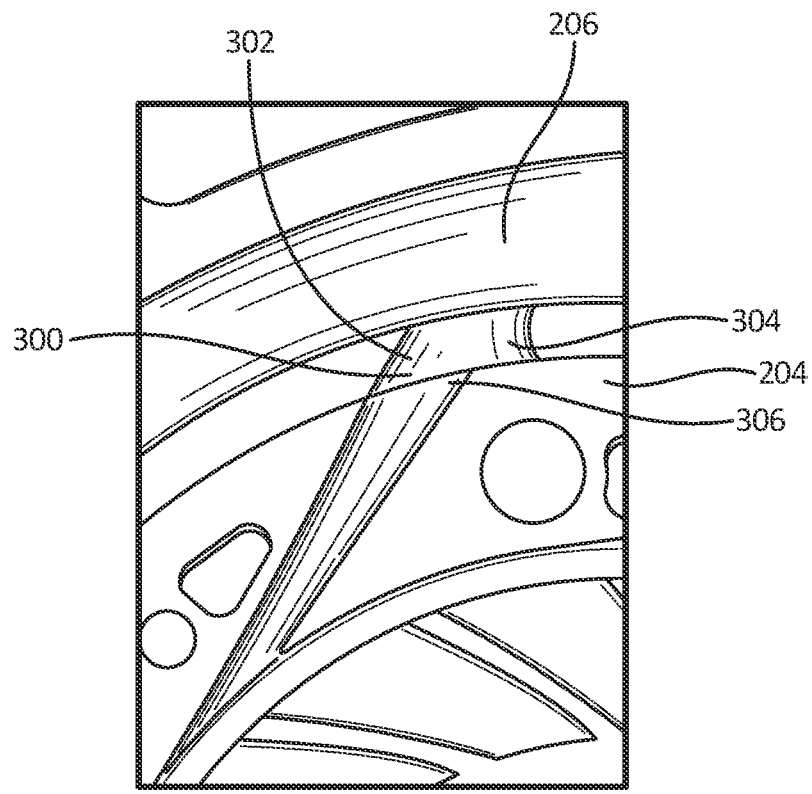
FIG. 3A is a perspective view of a prior art volute entrance connected to a diffuser ring.
Figure 3B:
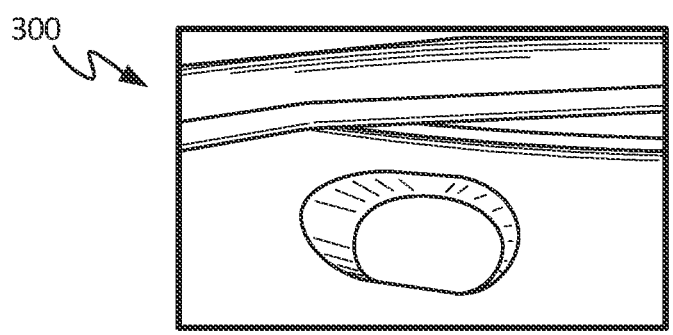
FIG. 3B is a perspective view of the prior art volute entrance geometry.

FIG. 3A is a perspective view of prior art coupler 300 connecting diffuser ring 204 to volute 206. FIG. 3B is a perspective view of the geometry of prior art coupler 300. Coupler 300 includes flow zone 302 and dead zone 304. Diffuser ring 204 includes diffuser ring exit 306. As described with respect to FIG. 2, fluid can travel from diffuser ring 204, through coupler 300, and to volute 206.

As depicted in FIGS. 3A and 3B, coupler 300 creates a volute entrance having an ovular cross-section, while diffuser ring exit 306 has a circular cross section. While fluid travels from diffuser ring 204 to volute 206, the fluid passes through diffuser ring exit 306 and through the volute entrance created by coupler 300. Flow zone 302 represents an area within coupler 300 in which fluid can flow through when the fluid passes through the volute entrance. Dead zone 304 represents an area in which fluid does not flow when the fluid exits diffuser ring 204 at a high velocity. As a result of dead zone 304, the fluid flowing within coupler 300 can experience fluid pressure loss, which is an undesirable effect on fluid traveling to volute 206.

Dead zone 304 is a result of limitations on casting methods of producing prior art volute entrance 300. In some examples, casting as a method of manufacturing can limit the curvature of the radius of coupler 300, resulting in the need to create a gentler curve with an ovular cross section as opposed to a sharper curve with a circular cross section. Thus, additive manufacturing can be beneficial in improving and optimizing the shape of a volute entrance.

Figure 4A:
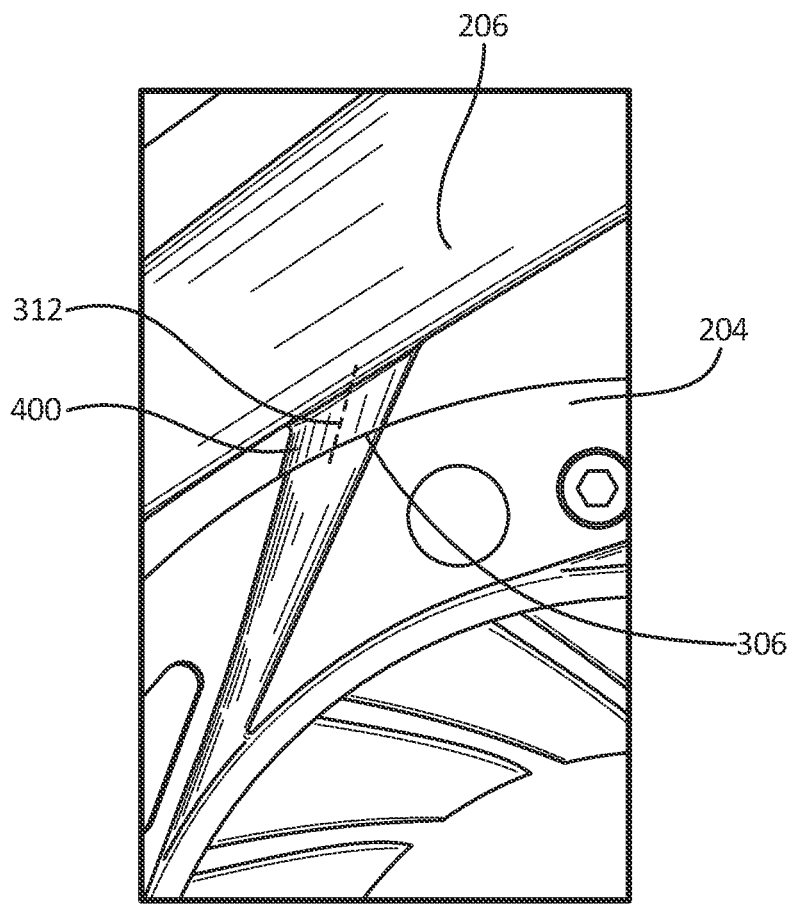
FIG. 4A is a perspective view of a volute entrance connected to the diffuser ring.
Figure 4B:
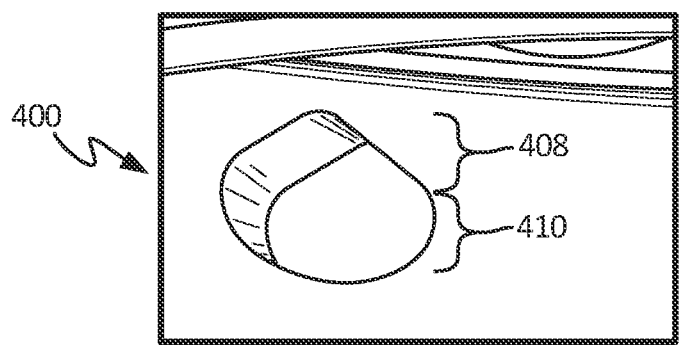
FIG. 4B is a perspective view of the volute entrance geometry.

FIG. 4A is a perspective view of additively manufactured coupler 400 connecting diffuser ring 204 to volute 206. FIG. 4B is a perspective view of the geometry of additively manufactured coupler 400. Diffuser ring 204 includes diffuser ring exit 306. As described with respect to FIG. 2, fluid can travel through diffuser ring 204, through additively manufactured coupler 400, and to volute 206.

Additively manufactured coupler 400 has a teardrop shaped cross-section. Coupler 400 includes upper portion 408 and lower portion 410. Coupler 400 also includes centerline path 312. Upper portion 408 of coupler 400 forms a V-shape extending from lower portion 410. Upper portion 408 can have a radius at a vertex of the V-shape. Lower portion 410 of coupler 400 has a semicircle cross section. Diffuser ring exit 306 is circular at the point where diffuser ring 204 is fluidly connected to coupler 400. The entrance to volute 206 at the point where volute 206 contacts coupler 400 can also be circular.

The cross-sectional area of additively manufactured coupler 400 can vary along an axial direction, wherein the axial direction is also the direction of fluid flow. Thus, for example, the cross-sectional area of coupler 400 can be lower at the point where coupler 400 contacts diffuser ring exit 306 as compared to the cross-sectional area at the point where coupler 400 contacts volute 206. Thus, the cross-sectional area of coupler 400 can increase along the axial direction.

The orientation of coupler 400 can also be varied such that centerline path 312 of coupler 400 is in a desired position. In one embodiment, coupler 400 can be aligned such that centerline path 312 is in line with a fluid flow path from the diffuser ring. In other embodiments, centerline path 312 is oriented such that coupler 400 is aligned with a curvature of volute 206 where coupler 400 and volute 206 are in contact. Additional orientations of coupler 400 can be used in order to improve fluid flow properties desirable in pump applications.

Additively manufactured coupler 400 provides several advantages. As described above, the teardrop geometry of coupler 400 is more conducive to retaining fluid pressure of fluid entering volute 206 from diffuser ring 204 than the ovular geometry of prior art volute entrance 300. Further, the teardrop geometry ensures that coupler 400 can be additively manufactured without additional support structures. Additionally, there is more flexibility in orientation of coupler 400, as the centerline can be adjusted in various ways to improve flow performance of fluid entering volute 206. The additive manufacturing process is also beneficial as it can decrease defects and scrap rates that may be associated with other manufacturing methods.

Figure 5:
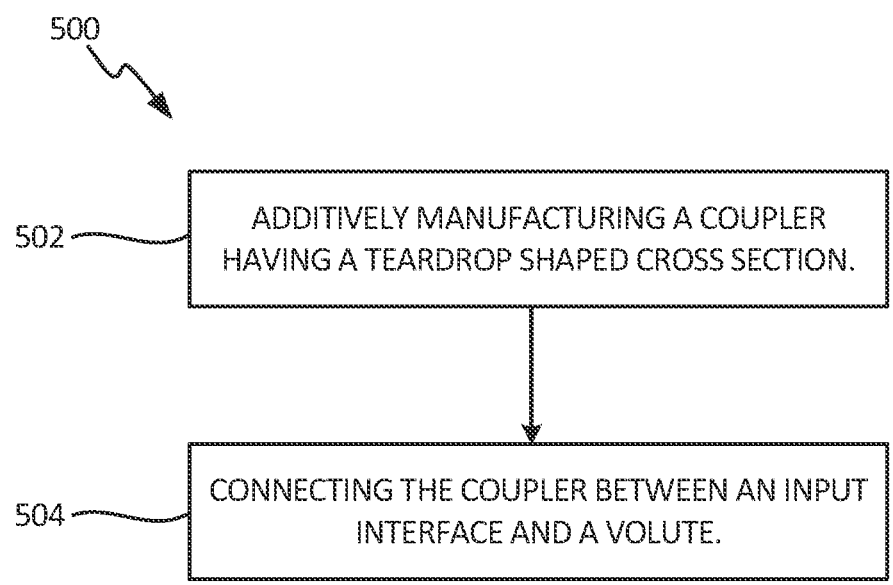
FIG. 5 is a flowchart depicting a method for forming a fluid connection between a volute and an input interface.

FIG. 5 is a flowchart depicting method for forming a fluid connection between a volute and an input interface 500. Method 500 begins at step 502 with additively manufacturing a coupler having a teardrop shaped cross section. At step 504, the coupler is connected between an input interface and a volute. In some embodiments, the step of connecting the coupler between an input interface and a downstream volute further includes integrally forming the coupler and the downstream volute by additive manufacturing. In such an embodiment, the coupler and the downstream volute are additively manufactured together, and the coupler is attached to the input interface, such as a diffuser ring, thereafter. Method 500 can further include connecting the downstream volute to an exit valve, such as exit valve 212 of FIG. 2.

The techniques of this disclosure demonstrate the improvement and advantages of an additively manufactured coupler with a teardrop cross section which connects an input interface, such as a diffuser ring, to a volute. Such an additively manufactured coupler can be used within a pump assembly to minimize pressure losses for a fluid traveling through an impeller and to a volute. The additively manufactured volute entrance can have the further advantages of being self-supporting during additive manufacturing. The additive manufacturing process can also provide the benefits of increased efficiency and a decreased scrap rate over other manufacturing methods.

Discussion of Possible Embodiments

The following are non-exclusive descriptions of possible embodiments of the present invention.

A pump assembly includes an impeller and a diffuser ring fluidly coupled to the impeller. The pump assembly further includes a volute fluidly coupled to the diffuser ring via an additively manufactured coupler having a teardrop shaped cross section. The volute is configured to receive fluid from the diffuser ring through the additively manufactured coupler.

The pump assembly of the preceding paragraph can optionally include, additionally and/or alternatively, any one or more of the following features, configurations and/or additional components:

A further embodiment of the foregoing pump assembly, further comprising a valve, wherein the volute is fluidly coupled to the valve.

A further embodiment of the foregoing pump assembly, wherein a cross-sectional area of the coupler varies along an axial direction.

A further embodiment of the foregoing pump assembly, wherein a cross-sectional area of the coupler increases along an axial direction from a diffuser ring interface side to a volute interface side.

A further embodiment of the foregoing pump assembly, wherein the additively manufactured coupler comprises an upper portion and a lower portion, wherein the upper portion of the additively manufactured coupler has a V-shaped cross-section extending from the lower portion of the additively manufactured coupler.

A further embodiment of the foregoing pump assembly, wherein the lower portion of the additively manufactured coupler has a semicircle cross section.

A further embodiment of the foregoing pump assembly, wherein an exit of the diffuser ring is circular at the point where the diffuser ring is fluidly connected to the additively manufactured coupler.

A further embodiment of the foregoing pump assembly, wherein an entrance of the volute is circular at the point where the additively manufactured coupler is fluidly connected to the volute.

A further embodiment of the foregoing pump assembly, wherein the additively manufactured coupler is aligned such that a centerline path of the volute entrance is in line with a flow path from the diffuser ring.

A further embodiment of the foregoing pump assembly, wherein the additively manufactured coupler is positioned such that the additively manufactured coupler is aligned with a curvature of the volute where the additively manufactured coupler and the volute are in contact.

A method for forming a fluid connection between a volute and an input interface configured to provide fluid to the volute includes additively manufacturing a coupler having a teardrop shaped cross-section. The method further includes connecting the coupler between an input interface and a volute.

A further embodiment of any of the foregoing methods, wherein the step of connecting the coupler between the input interface and the volute further includes integrally forming the coupler and the volute by additive manufacturing.

A further embodiment of any of the foregoing methods, further comprising fluidly connecting the volute to an exit valve.

A further embodiment of any of the foregoing methods, wherein the coupler is additively manufactured such that a cross-sectional area of the volute entrance varies along an axial direction.

A further embodiment of any of the foregoing methods, wherein the coupler is additively manufactured such that the cross-sectional area of the coupler increases along an axial direction from an input interface side to a volute interface side.

A further embodiment of any of the foregoing methods, wherein the coupler is additively manufactured such that the coupler comprises an upper portion and a lower portion, wherein the upper portion of the coupler forms a V-shaped cross-section extending from the lower portion of the coupler.

A further embodiment of any of the foregoing methods, wherein the lower portion of the coupler has a semicircle cross-section.

A further embodiment of any of the foregoing methods, wherein an exit of the input interface is circular at the point where the input interface is connected to the coupler.

A further embodiment of any of the foregoing methods, wherein the coupler is connected between the input interface and the downstream volute such that a centerline path of the volute entrance is aligned with a flow path from the input interface.

A further embodiment of any of the foregoing methods, wherein the coupler is connected between the input interface and the downstream volute such that the coupler is aligned with a curvature of the downstream volute where the coupler and the downstream volute are in contact.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pump assembly, comprising:
   an impeller;
   a diffuser ring with a diffuser ring exit, wherein the diffuser ring is fluidly coupled to the impeller; and
   a volute fluidly coupled to an additively manufactured coupler, wherein the additively manufactured coupler has a teardrop shaped cross-section and wherein the additively manufactured coupler is fluidly coupled to the diffuser ring exit;
   wherein the volute is configured to receive fluid from the diffuser ring through the additively manufactured coupler, and wherein:
      the additively manufactured coupler comprises an upper portion and a lower portion;
      the upper portion of the additively manufactured coupler has a V-shaped cross-section extending from the lower portion of the additively manufactured coupler; and
      the upper portion comprises a radius at a vertex of the V-shape;
   wherein the diffuser ring exit comprises a circular cross-section where the diffuser ring exit is fluidly connected to the teardrop shaped cross-section of the additively manufactured coupler; and
   wherein the volute comprises an entrance where the volute contacts the teardrop shaped cross-section of the additively manufactured coupler, and wherein the entrance of the volute comprises a circular cross-section.

2. The pump assembly of claim 1, further comprising a valve, wherein the volute is fluidly coupled to the valve.

3. The pump assembly of claim 1, wherein a cross-sectional area of the additively manufactured coupler varies along an axial direction of the additively manufactured coupler.

4. The pump assembly of claim 1, wherein a cross-sectional area of the additively manufactured coupler increases along an axial direction of the additively manufactured coupler from a diffuser ring interface side to a volute interface side.

5. The pump assembly of claim 1, wherein the lower portion of the additively manufactured coupler has a semicircle cross-section.

6. The pump assembly of claim 1, wherein the V-shaped cross section of the upper portion of the additively manufactured coupler extends from where the additively manufactured coupler fluidly connects to the diffuser ring exit to where the additively manufactured coupler contacts the entrance of the volute.

7. The pump assembly of claim 6, wherein:
   the lower portion of the additively manufactured coupler has a cross-section of a major segment below a chord of a circle; and
   the major segment of the cross-section of the lower portion of the additively manufactured coupler aligns with a portion of the diffuser ring exit.

8. The pump assembly of claim 1, wherein the additively manufactured coupler is aligned such that a centerline path of the entrance of the volute is in line with a flow path from the diffuser ring.

9. The pump assembly of claim 1, wherein the additively manufactured coupler is positioned such that the additively manufactured coupler is aligned with a curvature of the volute.

10. A method for forming a fluid connection between a volute and an input interface of a pump assembly, the input interface configured to provide fluid to the volute, the method comprising:
additively manufacturing a coupler fluidically connected to the input interface and fluidically connected to the volute, the coupler having a teardrop shaped cross-section, wherein:
the coupler is additively manufactured such that the coupler comprises an upper portion and a lower portion;
the upper portion of the coupler forms a V-shaped cross-section extending from the lower portion of the coupler;
the upper portion comprises a radius at a vertex of the V-shape;
the volute comprises an entrance where the volute contacts the teardrop shaped cross-section of the coupler, and wherein the entrance of the volute comprises a circular cross-section; and the input interface is a diffuser ring exit.

11. The method of claim 10, wherein the V-shaped cross section of the upper portion of the coupler extends from the input interface to the entrance of the volute.

12. The method of claim 11, wherein:
the lower portion of the additively manufactured coupler has a cross-section of a major segment below a chord of a circle;
the input interface is circular at a point where the additively manufactured coupler is fluidically coupled to the diffuser ring exit; and
the major segment of the cross-section of the lower portion of the additively manufactured coupler aligns with a portion of the diffuser ring exit.

13. The method of claim 10, further comprising fluidly connecting the volute to an exit valve.

14. The method of claim 10, wherein the coupler is additively manufactured such that a cross-sectional area of the coupler varies along an axial direction of the coupler.

15. The method of claim 14, wherein the coupler is additively manufactured such that the cross-sectional area of the coupler increases along the axial direction of the coupler from an input interface side to a volute interface side.

16. The method of claim 10, wherein the lower portion of the coupler has a semicircle cross-section.

17. The method of claim 10, wherein a centerline path of an entrance to the volute is aligned with a flow path from the input interface.

18. The method of claim 10, wherein the coupler is aligned with a curvature of the volute.

* * * * *